ANTHRAQUINONE DYES

**3,801,606
ANTHRAQUINONE DYES**
Hans-Samuel Bien, Burscheid, Walter Hohmann and Heinrich Vollmann, Leverkusen, and Heinrich Leister, Cologne-Stammheim, Germany, assignors to Bayer Aktiengesellschaft, Leverkusen, Germany
No Drawing. Continuation of abandoned application Ser. No. 571,431, Aug. 10, 1966. This application May 25, 1970, Ser. No. 41,689
Int. Cl. C09b 1/50
U.S. Cl. 260—380           4 Claims

ABSTRACT OF THE DISCLOSURE

Novel dyes which are 1,4-dihydroxy-8-amino-anthraquinones having in the 5-position an unsubstituted or substituted amino group and in the 7-position an alkoxy, phenoxy, mercapto or thiophenyl group, are produced by reacting a 1,4-dihydroxy-8-amino-anthraquinone which contains in the 5-position an unsubstituted or substituted amino group and in the 7-position a halogen, phenoxy or sulfonic acid group with a mercaptan, thiophenol, alcohol or phenol. Affinity of the dyes can be improved by halogenation.

---

This case is a continuation of Ser. No. 571,431, filed Aug. 10, 1966, now abandoned.

This invention comprises new and valuable anthraquinone dyes, and the production and use of the same.

The new dyes are 1,4-dihydroxy-8-amino-anthraquinones which contain in the 5-position an unsubstituted or substituted amino group and, in the 7-position, an alkoxy, phenoxy, mercapto or thiophenyl group which may optionally contain halogen.

They are obtainable according to the invention when 1,4-dihydroxy-8-amino-anthraquinones which contain an unsubstituted or substituted amino group in the 5-position and halogen or a phenoxy or sulphonic acid group in the 7-position are reacted with mercaptans, thiophenols, alcohols or phenols and the obtained dyes optionally after-halogenated.

The new dyes are particularly suitable for the dyeing and printing of synthetic fibres.

The amino group in the 5-position of the anthraquinones used as starting material may be primary, secondary or tertiary. As substituents, it contains preferably hydrocarbon radicals such as alkyl radicals (preferably up to 6 carbon atoms), aralkyl radicals, cycloalkyl radicals, preferably the cyclohexyl radical or aryl radicals preferably phenyl radicals, which may optionally contain further substituents such as halogen (e.g. chlorine or bromine), hydroxy, alkyl (preferably lower alkyl radicals), alkoxy (preferably lower alkoxy radicals), cyano, amino, nitro or carboxylic ester groups, preferably of lower aliphatic carboxylic acids. The term lower alkyl designates in this application compounds containing up to 4 carbon atoms.

Examples of the substituted 1,4-dihydroxy-anthraquinones used for the process according to the invention are:

7-bromo-8-amino-5-methylamino-,
7-bromo-8-amino-5-ethylamino-,
7-bromo-8-amino-5-butylamino-,
7-bromo-8-amino-5-β-oxyethylamino-,
7-bromo-8-amino-5-γ-oxypropylamino-,
7-chloro-8-amino-5-β-ethoxy-ethylamino-,
7-bromo-8-amino-5-γ-butoxypropylamino-,
7-bromo-8-amino-5-β-carbethoxyethylamino-,
7-bromo-8-amino-5-isopropylamino-,
7-bromo-8-amino-5-tert.-butylamino-,
6-bromo-5,8-diamino-,
7-bromo-8-amino-5-cyclohexylamino-,
7-bromo-8-amino-5-p-methylcyclohexyl-amino-,
7-bromo-8-amino-5-benzylamino-,
7-bromo-8-amino-5-α-phenylethyl-amino-,
7-bromo-8-amino-5-β-phenyl-ethylamino-,
7-sulpho-8-amino-5-anilino-,
7-phenoxy-8-amino-5-anilino-,
7-bromo-8-amino-5-o-toluidino-,
7-bromo-8-amino-5-m-toluidino-,
7-bromo-8-amino-5-p-toluidino-,
7-bromo-1-amino-5-o-anisidino-,
7-phenoxy-8-amino-5-o-anisidino-,
7-chloro-8-amino-5-m-anisidino-,
7-bromo-8-amino-5-p-anisidino-,
7-sulpho-8-amino-5-m-chloroanilino-,
7-chloro-8-amino-5-p-chloroanilino-,
7-bromo-8-amino-5-p-phenetidino-,
7-bromo-8-amino-5-m-acetylamino-anilino-,
7-bromo-8-amino-5-p-oxymethylanilino-,
7-bromo-8-amino-5-m-oxyanilino-,
7-bromo-8-amino-5-(p-methoxy-m-chloro-anilino)-,
7-bromo-8-amino-5-[p-(hydroxyacetamino)-anilino]-,
7-bromo-8-amino-5-p-fluoro-anilino-1,4-dihydroxy-anthraquinone.

The mercaptans and alcohols or thiophenols or phenols used for the reaction may be the simple compounds, but may also be substituted compounds which contain e.g. hydroxyl groups, alkoxy groups, halogens, lower alkyl radicals or possibly alkyl-mercapto groups.

The mercaptans contain preferably hydrocarbon radicals with up to 6 carbon atoms and contain as substituents preferably hydroxyl, lower alkoxy or carboxylic acid ester groups. The alcohols also contain preferably hydrocarbon radicals with up to 6 carbon atoms which may themselves contain as substituents preferably hydroxyl, lower alkoxy or phenyl groups. The phenols or thiophenols are preferably compounds of the benzene series which contain as substitutents preferably halogen (e.g. chlorine or bromine), lower alkyl radicals (e.g. methyl, ethyl or tertiary butyl radicals), which may themselves again be substituted, e.g. by hydroxyl groups (e.g. hydroxyethyl groups) or lower alkylmercapto groups. Examples of such compounds are the following: methylmercaptan, ethylmercaptan, butylmercaptan, hexylmercaptan, cyclohexylmercaptan, benzylmercaptan, mercaptoethanol, thioglycerin, 3-mercaptobutanol-1, thiophenol, o-methylthiophenol, o-chlorothiophenol, m-bromo-thiophenol, p-carbomethoxythiophenol, m-carbethylthiophenol, methanol, ethanol, butanol, glycolmonomethyl ether, glycolmonobutyl ether, glycol, cyclohexanol, phenol, m-cresol, p-chlorophenol, o-bromophenol, resorcinolmonomethyl ether or methylmercaptophenol. The process is preferably carried out in a solvent, e.g. in methanol, ethanol, butanol, isopropanol, dimethylformamide, N-methyl-pyrroldine, chlorobenzene or glycolmonomethyl ether. The reaction may be carried out both at room temperature and at elevated temperature, e.g. at temperatures in the range between 20° and 200° C. It is also possible to work in the presence of acid-binding agents, e.g. in the presence of alkali metal carbonates, acetates, hydroxides, alcoholates or also tertiary amines.

The new dyes are finely divided in the customary manner, e.g. by pasting from sulphuric acid or an organic solvent and subsequent grinding or kneading with dispersing agents. They dye (according to the printing and dyeing processes known in practice) synthetic material of e.g. polyester, polyamides or triacetate in blue to green shades in very good fastnesses to wet processing, sublimation and thermofixation as well as good light-fastness. By mixture of individual dyes, as also by halogenation, the affinity can be improved. The halogenation may therefore be carried out in customary manner with halogens such as chlorine or bromine, or with conventional agents which split off halogen, such as bromosuccinimide, sulphuryl chloride or N-bromo-p-toluene-m-sulphamide. Solvents used are for example sulphuric acid (20–90%), hydrochloric acid, nitrobenzene, chlorobenzene, o-dichlorobenzene, glacial acetic acid. The halogen may enter both in an external aryl nucleus and into the anthraquinone nucleus. Preferably, therefore, on average 0.1 to 1 halogen radical per anthraquinone molecule is introduced.

In the examples, the parts stated are parts by weight and the temperatures are degrees Celsius.

EXAMPLE 1

(a) A mixture of 8.6 parts 7-bromo-8-amino-5-cyclohexylamino-1,4-dihydroxy-anthraquinone. 4.3 parts sodium carbonate, 90 parts glycolmonomethyl ether and 3.1 parts thioglycol is heated to 120° C. for 45 minutes and 45 parts water are added dropwise in the cold. The crystalline product is filtered off with suction, washed with water, and the residue is boiled up in 150 parts acidified water. After being filtered off with suction it is washed neutral and dried. 6.7 parts (=78% of the theory) 5-amino - 8 - cyclohexylamino-7-β-hydroxyethylmercapto-1,4-dihydroxy-anthraquinone are obtained.

(b) 10 parts skein material of polyethyleneglycolterephthalate are dyed at 96–98° C. for two hours after addition of sulphuric acid until a pH-value of 4.5 is set up in a liquor consisting of 600 parts water, 0.1 part of the dye of Example 1(a) in finely divided form, 3.4 parts of a mixture of o-, m-, p-cresotic acid methyl ester and 0.6 part of a mixture of equal parts aralkylsulphonate and a non-ionic polyglycol ether. Rinsing and drying are then effected. The fastness to rubbing can be improved if after-treatment is carried out for 10–30 minutes in a gently boiling bath which contains, per 1000 parts water, 5.5 parts caustic soda solution of 38° Bé., 2 parts sodium dithionite and 1 part of a polyglycol ether of a fatty acid amide. A clear, bluish-green dyeing of good to very good fastnesses, in particular of excellent fastness to sublimation, is obtained.

(c) 10 parts flock of polyethyleneglycolterephthalate are dyed for 2 hours at 120–130° C. in a liquor (pH 4.5) consisting of 400 parts water and 0.15 part, in the most finely divided form, of the dye prepared according to Example 1(a), as well as 0.3 part of a mixture of equal parts aralkylsulphonate and a non-ionic polyglycol ether. After rinsing and drying, a clear, bluish-green dyeing is obtained.

(d) A fabric of polyester fibre material, prepared from terephthalic acid and 1,4-bis-hydroxymethylcyclohexane is impregnated on the padding mangle with a liquor which contains, in 1000 parts water, 20 parts of the dye of Example 1 in finely divided form as well as 10 parts of a thermosol auxiliary, in particular a polyethylene ether, such as is described e.g. in Belgian patent specification No. 615,102.

The fabric is then squeezed to a weight increase of 70% and dried in a suspension nozzle drier or in a drying cabinet at 80 to 120° C. Thereafter the fabric is treated with hot air for about 45 seconds at 180 to 220° C. in a stenter or in a jet hot flue, after which it is rinsed, possibly subjected to a reductive after-treatment, and dried. The reductive after-treatment for the purpose of removing particles of dye adhering superficially to the fibres may take place in such a manner that the fabric is entered at 20 to 25° C. into a liquor containing 3–5 ml./l. caustic soda solution of 38° Bé. and 1–2 g./l. hydrosulphite, heated to 70° C. within 15 minutes and left for a further 10 minutes. This is followed by acidification with 2–3 ml./l. 85% formic acid at 50° C., rinsing and drying. A clear, bluish-green dyeing is obtained.

(e) If the fabric of polyester fibre material is replaced by one of polyamide, prepared from hexamethylenediamine and adipic acid, and otherwise the same procedure as described in Example 1(d) is followed, but without reductive after-treatment, a clear, bluish-green dyeing of good to very good fastnesses is obtained.

(f) The fabric of polyester fibre material is replaced by a fabric of triacetate and otherwise the same procedure as described in Example 1(d) is followed. A clear, bluish-green dyeing of good fastness is obtained.

(g) 10 parts skein material of a polyamide (prepared by condensation of caprolactam) are slowly heated to the boil and dyed at the boil for 1 hour in a liquor which contains, in 400 parts water, 0.2 part, in finely divided form, of dye prepared according to Example 1(a), and 0.2 g. of a customary dispersing agent. A clear, bluish-green dyeing is obtained.

(h) 10 parts skein material of cellulose triacetate are dyed at 96–98° C. for one hour after adjustment to pH 5 (with formic acid) of the pH-value in a liquor which contains 400 parts water, 0.2 parts in finely divided form of dye according to Example 1(a), 3.4 parts of a mixture of o-, m-, p-cresotic acid methyl ester and 0.6 part of a mixture of equal parts aralkylsulphonate and a non-ionic polyglycol ether. A clear, bluish-green dyeing is obtained.

(i) 100 parts cellulose triacetate as combed material are dyed for 2 hours at 120 to 130° C. in a liquor of pH 4.5 consisting of 1000 parts water and 1.5 parts, in the most finely divided form, of the dye of Example 1(a) as well as 3 parts of a mixture of equal parts aralkylsulphonate and a non-ionic polyglycol ether. After rinsing and drying, a clear, bluish-green dyeing is obtained.

EXAMPLE 2

(a) 8.8 parts 7-bromo-8-amino-5-p-toluidino-quinizarin, 4.3 parts sodium carbonate, 90 parts glycolmonoethyl ether and 3.1 parts thioglycol are heated to 120° C. for one hour, filtered off cold with suction and washed with glycolmonoethyl ether until there is a slightly green run-off. The filter residue is boiled up in 100 parts acidified water, filtered off hot with suction and washed neutral. 7 parts (=80% of the theory) 8-amino-5-p-toluidino-7-β-hydroxyethylmercapto - 1,4 - dihydroxy-anthraquinone are obtained.

(b) The dye may be dyed according to the various methods which are described in Examples 1(b) to (i). Thus, for example according to 1(c) there is obtained on polyester material a green dyeing of good to very good fastnesses, above all of excellent fastness to sublimation; and according to 1(g), on polyamide green dyeings also are obtained.

(c) The dyes stated in the following can be prepared and dyed according to the method of Example 2 when the equimolar amounts of the appropriate starting compounds are used.

| Ex. | Dye | Yield, percent | Shade |
|---|---|---|---|
| 3 | 8-amino-5-anilino-7-β-hydroxyethylmercapto-1,4-dihydroxy-anthraquinone. | 78 | Somewhat bluish green. |
| 4 | 8-amino-5-o-anisidino-7-β-hydroxyethylmercapto-1,4-dihydroxy-anthraquinone. | 76 | Green. |
| 5 | 8-amino-5-m-phenetidino-7-β-hydroxyethylmercapto-1,4-dihydroxy-anthraquinone. | 70 | Do. |
| 6 | 8-amino-5-p-anisidino-7-β-hydroxyethylmercapto-1,4-dihydroxy-anthraquinone. | 77 | Do. |
| 7 | 8-amino-5-m-toluidino-7-β-hydroxyethylmercapto-1,4-dihydroxy-anthraquinone. | 70 | Do. |

EXAMPLE 8

(a) 13.9 parts 7-bromo-5,8-diamino-1,4-dihydroxy-anthraquinone, 6.4 parts sodium carbonate, 70 parts glycolmonomethyl ether and 6.6 parts thiophenol are heated to 120° C. for 1 hour; 60 parts methanol are then added dropwise at 60° C. followed by 7 parts hydrochloric acid at 20–30° C. The crystallized residue is filtered off with suction and washed with methanol. After being boiled up in 100 parts acidified water it is filtered off with suction, washed neutral and dried. 14.5 parts (=96% of the theory) 5,8-diamino-7-phenylmercapto-1,4-dihydroxy-anthraquinone are obtained. According to Example 1(b), the dye yields on polyester material a strong, clear, greenish-blue dyeing of good fastness to sublimation and light.

(b) According to analogous methods the following dyes may be prepared, which for example according to 1(d) give blue dyeings with good fastnesses.

| Ex. | Dye | Yield, percent | Shade |
|---|---|---|---|
| 9 | 5,8-diamino-7-o-methylphenylmercapto-1,4-dihydroxy-anthraquinone. | 92 | Greenish blue. |
| 10 | 5,8-diamino-7-m-methylphenylmercapto-1,4-dihydroxy-anthraquinone. | 91 | Do. |
| 11 | 5,8-diamino-7-p-methylphenylmercapto-1,4-dihydroxy-anthraquinone. | 92 | Do. |
| 12 | 5,8-diamino-7-p-chlorophenylmercapto-1,4-dihydroxy-anthraquinone. | 96 | Do. |
| 13 | 5,8-diamino-7-β-hydroxyethylmercapto-1,4-dihydroxy-anthraquinone. | 85 | Somewhat greenish blue. |

EXAMPLE 14

(a) A mixture of 8.8 parts 7-bromo-8-amino-5-p-toluidino-1,4-dihydroxy-anthraquinone, 4.3 parts sodium carbonate, 90 parts glycolmonomethyl ether and 4.4 parts thiophenol are heated to 120° C. for 1 hour, filtered off cold with suction and washed with glycolmonomethyl ether and methanol. The residue is boiled up in 100 parts acidified water, filtered off with suction and washed neutral. After drying, 8.8 parts (=94% of the theory) 8 - amino - 5-p-toluidino-7-phenylmercapto-1,4-dihydroxy-anthraquinone are obtained.

(b) According to Example 1(d), a green dyeing very fast to sublimation and a good light-fastness is obtained.

(c) Analogously to Example 14, the following compounds may also be prepared and dyed:

| Ex. | Dye | Yield, percent | Shade |
|---|---|---|---|
| 15 | 8-amino-5-p-toluenesulphamido-7-phenylmercapto-1,4-dihydroxy-anthraquinone. | 88 | Reddish blue. |
| 16 | 8-amino-5-o-anisidino-7-phenylmercapto-1,4-dihydroxy-anthraquinone. | 92 | Green. |
| 17 | 8-amino-5-cyclohexylamino-7-phenylmercapto-1,4-dihydroxy-anthraquinone. | 89 | Blue-green. |

EXAMPLE 18

2.7 parts butylmercaptan are added to a mixture of 8.5 parts 7-bromo-8-amino-5-anilino-1,4-dihydroxy - anthraquinone, 3.2 parts sodium carbonate and 85 parts glycolmonomethyl ether, and the mixture is heated to 120° C. for one hour. This is followed by filtering off cold with suction, washing with methanol, boiling up in 100 parts acidified water, washing neutral and drying. 7.8 parts (=90% of the theory) 8-amino-5-anilino-7-butylmercapto-1,4-dihydroxy-anthraquinone are obtained. When dyeing according to Example 1(c) is effected, a somewhat bluish green dyeing is obtained.

EXAMPLE 19

7.0 parts 7-bromo-5,8-diamino-1,4-dihydroxy-anthraquinone, 25 parts phenol and 1.1 parts potassium hydroxide are heated to 180° C. for 9 hours. After cooling of the mixture to 80° C., 25 parts methanol are added dropwise; this is followed by filtration with suction and washing phenol-free with methanol. The residue is then boiled up with 100 parts acidified water, filtered off with suction and washed neutral. 5.2 parts (=72% of the theory) 5,8-diamino-7-phenoxy-1,4-dihydroxy - anthraquinone are obtained in the form of blue needles. When dyeing is effected according to Example 1(g), a clear, blue dyeing of good fastness to light and sublimation is obtained.

EXAMPLE 20

7.6 parts 7-bromo-8-amino-5-methoxypropylamino-1,4-dihydroxy-anthraquinone, 4 parts thiophenol, 3.8 parts sodium carbonate and 75 parts glycolmonoethyl ether are heated to 120° C. for 1 hour and the crystalline substance which is obtained is filtered off cold with suction. The filter residue is washed with glycolmonoethyl ether until there is a greenish-blue run-off and then it is washed with methanol. The reaction product is then boiled up in 100 parts acidified water, filetred off hot with suction, washed neutral and dried. 6.4 parts (=79% of the theory) dye are obtained which, dyed according to Example 1(b), gives clear, blue-green shades of very good fastness to sublimation.

EXAMPLE 21

8.4 parts 8-amino-5-anilino-7-β-hydroxyethylmercapto-1,4-dihydroxy-anthraquinone are heated to 60° C. in 85 parts nitrobenzene and at this temperature 0.64 part bromine are added dropwise. After 2½ hours the nitrobenzene is removed by steam distillation and the residue which is formed is filtered off with suction and washed neutral. The bromination product contains 3.1% bromine. On polyester material there is obtained, for example according to Example 1(b), a green dyeing of outstanding fastness to sublimation.

EXAMPLE 22

8.4 parts 8-amino-5-anilino-7-β-oxyethylmercapto-1,4-dihydroxy-anthraquinone are suspended in 85 parts 20% hydrochloric acid and, after addition of 0.64 part bromine, stirred for 20 hours at room temperature. After filtration with suction, washing neutral with hot water and drying are effected. 8.4 parts of the bromination product (bromine content: 2.3%) are obtained. On polyamide fibre material there is obtained according to Example 1(f) a green dyeing with good fastness to wet processing.

EXAMPLE 23

1.7 parts boric acid are dissolved at 80° C. in 35 parts 50% sulphuric acid and into this solution there are introduced, at 20° C., 5 g. "kolloplex"—ground 8-amino-5-p-toluidino-7-β-oxyethylmercapto - 1,4 - dihydroxy-anthraquinone. To this suspension are added 0.1 part iodine and 0.2 part bromine. After the mixture has been heated to 40° C. for 2 hours, it is added to a mixture of 300 parts water and 5 parts 40% NaHSO₃ solution, filtered off cold with suction and washed with hot water. The bromination product contains 1.9% bromine, and when dyed according to Example 1(b) gives, on polyester material, green shades of good light-fastness and outstanding fastness to thermofixation.

EXAMPLE 24

7.6 parts 5,8-diamino-7-phenylmercapto-1,4-dihydroxy-anthraquinone are dissolved in 64 parts 87% sulphuric acid which contain 2.7 parts boric acid, and 0.1 part iodine and 0.64 part bromine are added. The reaction mixture is heated to 40° C. within 2 hours and this temperature is maintained for a further 2 hours. The mixture is added to a mixture of 350 parts water and 12.5 parts 40% NaHSO₃ solution, heated to 70° C., filtered off with suction, washed neutral and dried. The bromination product contains 4.8% bromine and dyes polyester material in clear, greenish-blue shades of good fastness to sublimation and light and is distinguished by outstanding affinity. By increasing the amount of bromine, products with higher bromine content up to 17.0% are obtained. The more bromine is introduced, the more strongly is the shade shifted to deeper hues.

| Ex. | Starting material | Amount of bromine | Bromine content, percent | Shade |
|---|---|---|---|---|
| 25 | 5,8-diamino-7-m-methyl-phenyl-mercapto-1,4-dihydroxy-anthra-quinone. | 0.32 | 1.9 | Clear, greenish blue. |
| 26 | 5,8-diamino-7-o-methyl-phenyl-mercapto-1,4-dihydroxy-anthra-quinone. | 0.96 | 8.8 | Do. |

EXAMPLE 27

3.9 parts potassium are dissolved in 85 parts glycolmonoethyl ether and then 8.5 parts 7-bromo-8-amino-5-anilino-1,4-dihydroxy-anthraquinone are introduced. The reaction mixture is heated to 125° C. for 12 hours and, after cooling, 50 parts water added dropwise. The crystallized reaction product is filtered off with suction and washed with a mixture of 42 parts glycolmonoethyl ether and 25 parts water. After washing with water, the residue is boiled out in 100 parts acidified water, filtered off with suction and dried. The dye which is obtained gives, on polyester material, dyeings in clear, greenish-blue shades of good fastness to sublimation when dyed according to Example 1(a).

EXAMPLE 28

8.8 parts 7-bromo-8-amino-5-p-toluidino-1,4-dihydroxy-anthraquinone, 5.6 parts potassium carbonate, 90 parts chlorobenzene and 6.4 parts thioglycol are heated to 130° C. for 10 hours, filtered off cold with suction and washed with chlorobenzene and methanol. The residue is boiled up in 200 parts acidified water, filtered off with suction and washed neutral. The dye obtained is identical with the dye obtained according to Example 2.

EXAMPLE 29

A similar dye to that according to Example 28 is obtained with 8.8 parts 7-bromo-8-amino-5-p-toluidino-1,4-dihydroxy-anthraquinone, 6.6 parts sodium acetate, 90 parts glycolmonoethyl ether and 6.4 parts thioglycol are heated to 130° C. for 9 hours and the crystalline product which is formed during cooling filtered off with suction, washed with glycolmonoether and methanol and worked up otherwise as described in Example 28.

EXAMPLE 30

10.1 parts 7-bromo-5-p-toluene sulphamido-8-amino-1,4-dihydroxy-anthraquinone, 1.7 parts potassium carbonate, 0.1 part copper oxide, 17 parts o-dichlorobenzene and 2.4 parts thiophenol are heated to 110° C. for 2 hours and diluted at 30° C. with 15 parts methanol. After 30 minutes, filtration with suction is effected, followed by washing with methanol and hot water. After boiling out with dilute hydrochloric acid, the residue is filtered off with suction, washed neutral and dried. 9.9 parts (=93% of the theory) 7-phenylmercapto-5-p-toluenesulphamido-8-amino-1,4-dihydroxy-anthraquinone are obtained. The dye is identical with that prepared according to Example 15.

According to method 1(d) there is obtained on polyester a blue dyeing of very god fastness to sublimation and light. By hydrolysis in 85% sulphuric acid a dye is obtained which is identical with that from Example 8.

EXAMPLE 31

4 parts 7-bromo-8-amino-5-methylamino-1,4-dihydroxy-anthraquinone, 2.3 parts sodium carbonate, 40 parts glycolmonoethyl ether and 2.4 parts thiophenol are heated to 120° C. for 1 hour. The crystallized product is filtered off with suction and washed with glycolmonoethyl ether and hot water. The substance is boiled out in 100 parts acidified water, washed neutral and dried. Yield: 3.6 g.=83.5% of the theory. Dyed according to Example 1(c), a blue-green dyeing of good fastness is obtained.

EXAMPLE 32

12.1 parts 7-bromo-8-amino-5-p-toluenesulphamido-1,4-dihydroxy-anthraquinone, 7.0 parts sodium carbonate and 20 parts phenol are heated to 150° C. for 2 hours. 20 parts methanol are added to 60° C. and the crystallized product filtered off with suction and washed with methanol and hot water. The residue is boiled out in 150 parts acidified water, filtered off with suction and washed neutral. Yield: 9.3 g.=75% of the theory. Dyed according to method 1(d), a reddish-blue dyeing of good fastness is obtained.

By hydrolysis in 80% sulphuric acid, a dye is formed which is identical with that described in Example 19.

EXAMPLE 33

5.4 parts 7-phenoxy-5,8-diamino-1,4-dihydroxy-anthraquinone in 54 parts 78% sulphuric acid are brominated at 20 to 25° C. with 0.5 part bromine. The mixture is poured into ice water, filtered off with suction and washed neutral. 5.5 parts of a dye (3.3% bromine) are obtained which according to method 1(b) gives reddish-blue, fast dyeings on polyester material.

EXAMPLE 34

9.2 parts 7-bromo-8-amino-5-p-chloroanilino-1,4-dihydroxy-anthraquinone, 3.2 parts sodium carbonate, 85 parts glycol-monoethylether and 2.3 parts thioglycol are heated to 120° C. for 1 hour. The crystallized reaction product is filtered off with suction and washed with glycolmonoethyl ether and methanol as well as water. The residue is boiled out in 100 parts acidified water, filtered off hot with suction, washed neutral and dried. Yield: 4.5 parts=50% of the theory. Dyed according to Example 1(d), the dye gives on polyester material bluish-green shades of very good fastness to sublimation and light.

EXAMPLE 35

If, in the previous example, the 7-bromo-8-amino-5-p-chloroanilino-1,4-dihydroxy-anthraquinone is replaced by the corresponding m-chlorine derivative, 7-oxyethylmercapto-8-amino-5-m-chloroanilino-1,4 - dihydroxy - anthraquinone is obtained in 60% yield.

In admixture with the dye prepared according to Example 34, there is obtained according to method 1(c) a bluish-green dyeing of very good fastness to sublimation and light.

EXAMPLE 36

18.2 parts 7 - bromo-8-amino-5-o-anisidino-1,4-dihydroxyanthraquinone, 3.2 parts sodium carbonate and 20 parts thioglycol are heated to 120° C. for 1 hour, diluted at 70° C. with 30 parts methanol, filtered off with suction and washed with methanol; this is followed by boiling out in 200 parts acidified water, filtering off with suction, washing neutral and drying. 15.4 parts (=85% of the theory) 7 - hydroxyethylmercapto - 8 - amino - 5 - o-anisidino - 1,4 - dihydroxy - anthraquinone are obtained. The product is identical with that prepared according to Example 4.

EXAMPLE 37

A mixture of 50 parts phenol and 4 parts powdered potassium hydroxide is heated to the boil for half an hour, in order to remove the water which is formed during the formation of potassium phenolate. The mixture is then cooled to about 120° C.; 15 parts 5-anilino-7-bromo-8-amino-1,4-dihydroxy-anthraquinone and 0.3 part copper powder are introduced and stirring effected for about 10 hours at 170° C. When starting material can no longer be detected chromatographically, cooling to about 70° C. is allowed to take place and dilution with 60 parts methanol is effected; this is followed by filtration (cold) with suction and washing with methanol and hot water. The suction filter cake is then boiled out with dilute hydrochloric acid. There are obtained about 15 parts (=97% of the theory) 5-anilino - 7 - phenoxy-8-amino-1,4 - dihydroxy - anthraquinone which, used according to Examples 1(b) and 1(c), dyes (with good affinity) polyester fibres greenish-blue with very good fastness to sublimation and light.

The following dyes can be prepared according to the information given in Example 37, using equimolar amounts of the appropriate phenols.

| Ex. | Dye | Yield, Percent | Dyeing According to Example | Shade |
| --- | --- | --- | --- | --- |
| 38 | 5-anilino-7-(2'-methyl-phenoxy)-8-amino-1,4-dihydroxy-anthraquinone. | 83 | 1c | Greenish blue. |
| 39 | 5-anilino-7-(3'-methyl-phenoxy)-8-amino-1,4-dihydroxy-anthraquinone. | 89 | 1c | Do. |
| 40 | 5-anilino-7-(4'-methyl-phenoxy)-8-amino-1,4-dihydroxy-anthraquinone. | 95 | 1c | Do. |
| 41 | 5-anilino-7-(2'-ethyl-phenoxy)-8-amino-1,4-dihydroxy-anthraquinone. | 74 | 1c | Do. |
| 42 | 5-anilino-7-(4'-tert.butyl-phenoxy)-8-amino-1,4-dihydroxy-anthraquinone. | 85 | 1d | Do. |
| 43 | 5-anilino-7-(3'-chloro-phenoxy)-8-amino-1,4-dihydroxy-anthraquinone. | 88 | 1d | Do. |
| 44 | 5-anilino-7-(4'-chloro-phenoxy)-8-amino-1,4-dihydroxy-anthraquinone. | 86 | 1d | Do. |
| 45 | 5-anilino-7-(4'-methylmer-capto-phenoxy)-8-amino-1,4-dihydroxy-anthraquinone. | 81 | 1c, 1d | Do. |
| 46 | 5-anilino-7-(3'-methyl-4'-methylmercapto-phenoxy)-8-amino-1,4-dihydroxy-anthraquinone. | 78 | 1c, 1d | Do. |

Example 47

5 parts 5-anilino-7-phenoxy-8-amino-14-dihydroxy-anthraquinone are dissolved in 85 parts 78% sulphuric acid, and 0.3 part bromine are added dropwise, with stirring, at 25° C. Stirring is continued for 1 hour, followed by emptying into 500 parts water, filtration with suction and washing neutral. The reaction product contains 2.8% bromine. On polyester material there is obtained according to Example 1(b) and 1(c) a full, greenish-blue dyeing of very good fastness to sublimation and light.

EXAMPLE 48

5 parts 5 - anilino - 7 - phenoxy-8-amino-1,4-dihydroxy-anthraquinone, 2 parts sodium carbonate and 50 parts ethyleneglycol are stirred together for 4 hours at 140° C. The mixture is allowed to cool, diluted with methanol and the homogeneous, crystallized 5-anilino-7-β-hydroxy-ethoxy - 8 - amino-1,4-dihydroxy-anthraquinone is filtered off with suction. Polyester fibres are dyed according to Examples 1(b) and 1(c) greenish-blue with very good fastness to sublimation and light.

The dye can also be obtained at 120° C. from 5-anilino-7-bromo - 8 - amino-1,4-dihydroxy-anthraquinone, sodium carbonate and ethyleneglycol.

EXAMPLE 49

0.3 part bromide are added dropwise at 25° C., with stirring, to a solution of 5 parts 5-anilino-7-β-hydroxy-ethoxy - 8-amino-1,4-dihydroxy-anthraquinone in 85 parts 78% sulphuric acid; stirring is continued for a further hour, followed by working up according to Example 47. The reaction product contains 1.8% bromine. Dyed according to Examples 1(b) and 1(c), it dyes polyester material heavily greenish-blue with very good fastness to sublimation and light.

EXAMPLE 50

5 parts 5 - anilino - 7 - phenoxy-8-amino-1,4-dihydroxy-anthraquinone, 2 parts sodium carbonate and 50 parts glycolmonomethyl ether are stirred together for 24 hours at 120 to 125° C. This is followed by cooling, dilution with methanol, filtering off cold with suction and washing with methanol and water. There are obtained about 4.2 parts (=88% of the theory) 5-anilino - 7 - β-methoxy-ethoxy - 8 - amino-1,4-dihydroxy-anthraquinone which, dyed according to Examples 1(b) and 1(c), dyes polyester material greenish-blue of very good fastness to sublimation.

The dye can also be prepared at 120 to 125° C. from 5-anilino-7-bromo-8-amino - 1,4 - dihydroxy-anthaquinone, sodium carbonate and glycolmonomethyl ether.

Analogously with Example 50, the following dyes can also be prepared.

| Ex. | Dye | Yield, percent | Dyeing According to Example | Shade |
| --- | --- | --- | --- | --- |
| 51 | 5-anilino-7-n-butoxy-8-amino-1,4-dihydroxy-anthra-quinone. | 82 | 1b, 1c | Greenish blue. |
| 52 | 5-anilino-7-(ω-hydroxy-n-hexoxy)-8-amino-1,4-dihydroxy-anthraquinone. | 73 | 1c | Do. |

EXAMPLE 53

30 parts 5-o-anisidino-7-bromo-8-amino-1,4-dihydroxy-anthraquinone and 0.5 part copper powder are introduced at about 120° C. into a potassium phenolate solution prepared according to Example 37 from 100 parts phenol and 8 parts powdered potassium hydroxide, and the mixture is stirred for 5 hours at 170° C. The starting material is then consumed. The melt is stirred into 200 parts methanol and a little water is added; this is followed by filtering off cold with suction and washing well with methanol and hot water, after which the suction filter cake is boiled out with dilute hydrochloric acid. There are obtained in this way about 28.7 parts (=93% of the theory) 5-o-anisidino-7 - phenoxy - 8 - amino - 1,4 - dihydroxy-anthraquinone. The dye, when dyed according to Examples 1(b) and 1(c), gives on polyester material a bluish-green dyeing of very good fastness to sublimation and light.

EXAMPLE 54

5 parts 5-o-anisidino-7-phenoxy-8-amino-1,4-dihydroxy-anthraquinone, 2 parts sodium carbonate and 50 parts benzyl alcohol are heated, with stirring, to 160° C. for 6 hours and to 180° C. for 2 hours. After the mixture is cold, filtration with suction and washing with methanol and water are effected. The dye obtained (5-o-anisidino-7-benzyloxy-8-amino-1,4-dihydroxy-anthraquinone, yield about 3.6 parts), when dyed according to Example 1(b) and 1(c), dyes polyester material blue-green with very good fastness to sublimation and good light-fastness.

A similar dye is formed when, instead of benzyl alcohol, ethyleneglycol is used and the reaction is carried out for 1 hour at 140° C. and for half an hour at 160° C.

We claim:
1. Anthraquinone dye of the formula

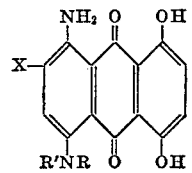

wherein

R and R' independently are hydrogen, alkyl containing up to 6 carbon atoms, benzyl, phenethyl, cyclohexyl or phenyl, R and R' being optionally substituted with halogen, hydroxy, lower alkyl, lower alkoxy, cyano, amino, nitro or lower alkoxy carbonyl;

X is alkylthio, phenylthio, or phenylthio substituted with hydroxyl, alkoxy, halogen, lower alkyl or alkylthio.

2. The dye of claim 1 wherein R and R' are hydrogen or phenyl; and X is alkylthio or phenylthio.

3. Anthraquinone dye of the formula
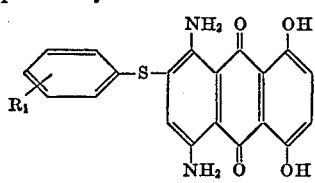
wherein $R_1$ is hydrogen, halogen or alkyl of 1-4 carbon atoms.
4. The dye of claim 1 of the formula
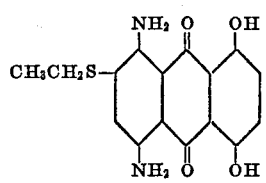
References Cited
UNITED STATES PATENTS
2,672,464    3/1954    Salvin et al. _____ 260—380
FOREIGN PATENTS
1,180,473    10/1964    Germany _____ 260—380
LORRAINE A. WEINBERGER, Primary Examiner
R. GERSTL, Assistant Examiner
U.S. Cl. X.R.
8—39, 40; 260—396, 379